(12) United States Patent
Wataru (10) Patent No.: US 9,672,111 B2
(45) Date of Patent: Jun. 6, 2017

(54) LOAD CONTROL BACKUP SIGNAL GENERATING CIRCUIT

(71) Applicant: Yazaki Corporation, Tokyo (JP)

(72) Inventor: Kazuhisa Wataru, Makinohara (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 14/730,388

(22) Filed: Jun. 4, 2015

(65) Prior Publication Data

US 2015/0355973 A1 Dec. 10, 2015

(30) Foreign Application Priority Data

Jun. 9, 2014 (JP) ................... 2014-118841

(51) Int. Cl.
G06F 11/00 (2006.01)
G06F 11/14 (2006.01)
(Continued)

(52) U.S. Cl.
CPC ............ G06F 11/1402 (2013.01); G06F 1/06 (2013.01); G06F 11/0706 (2013.01);
(Continued)

(58) Field of Classification Search
CPC ............ G06F 11/0757; G06F 11/0772; G06F 11/0739; G01R 31/00
See application file for complete search history.

(56) References Cited

U.S. PATENT DOCUMENTS 5,528,756 A * 6/1996 Molnar ............... G06F 11/0754
714/55
6,952,785 B1 * 10/2005 Diab ........................ G06F 1/26
370/244

(Continued)

FOREIGN PATENT DOCUMENTS

DE 102004033095 A1 5/2005
DE 102011076166 A1 11/2012
(Continued)

OTHER PUBLICATIONS

Communication dated Jan. 14, 2016, issued by the German Patent Office in counterpart German Application No. 102015210493.1.

*Primary Examiner* — Bryce Bonzo
*Assistant Examiner* — Jonathan Gibson
(74) *Attorney, Agent, or Firm* — Sughrue Mion, PLLC (57) ABSTRACT

A load control backup signal generating circuit for supplying a backup control signal to a switch of a load connected to an output of a control processor in a case that abnormality occurs in the control processor, includes a first input terminal that receives a constant period signal that is output periodically from the control processor when the control processor is normal, a constant period signal monitoring section that monitors a state of the constant period signal for identifying whether a length of the time during which a high or low level state of the constant period signal continues is longer than a predetermined time, and that outputs the signal corresponding to a result of the identification, and a backup signal output section that outputs the backup control signal when the output of the constant period signal monitoring section satisfies a predetermined condition.

12 Claims, 8 Drawing Sheets

(51) Int. Cl.
*G06F 1/06* (2006.01)
*G06F 11/16* (2006.01)
*G06F 11/07* (2006.01)

(52) U.S. Cl.
CPC ...... *G06F 11/0757* (2013.01); *G06F 11/1604* (2013.01); *G06F 2201/85* (2013.01)

(56) References Cited

U.S. PATENT DOCUMENTS

| | | | |
|---|---|---|---|
| 8,996,927 B2* | 3/2015 | Yoshikawa | ......... G06F 11/0757 714/55 |
| 2005/0085967 A1 | 4/2005 | Mitsueda et al. | |
| 2010/0004811 A1 | 1/2010 | Kannan et al. | |
| 2010/0332058 A1* | 12/2010 | Kane | ....... B61L 3/008 701/20 |

FOREIGN PATENT DOCUMENTS

| | | |
|---|---|---|
| JP | 201013988 A | 1/2010 |
| JP | 201198593 A | 5/2011 |

\* cited by examiner

LOAD CONTROL BACKUP SIGNAL GENERATING CIRCUIT

CROSS REFERENCE TO RELATED APPLICATIONS

The present application is based on Japanese Patent Application No. 2014-118841 filed on Jun. 9, 2014, the contents of which are incorporated herein by reference.

BACKGROUND

The present invention relates to a load control backup signal generating circuit for supplying a backup control signal to the switch of the load connected to the output of a control processor operating according to a predetermined program in the case that abnormality occurs in the control processor.

For example, a control micro-processor, i.e., a microcomputer (CPU: central processing unit), operating according to a predetermined program is incorporated in various electric control units (ECUs) mounted on vehicles.

Such a microcomputer usually carries out various controls as intended according to the content of a program prepared beforehand. However, for example, in the case that the microcomputer is affected due to electromagnetic noise entering from the outside, in the case that the microcomputer becomes faulty, or in the case that the microcomputer is affected due to defects (bugs) contained in the program itself, the microcomputer may sometimes cause an unexpected operation and may be brought into a runaway state.

If the microcomputer is brought into such a runaway state, the entire electric control unit falls into an uncontrollable state. Hence, in the systems of such various electric control units, it is necessary to monitor whether abnormality has occurred in the microcomputer, and in the case that the occurrence of abnormality is detected, it is necessary to return the microcomputer to its normal state.

Hence, in such various electric control units, the microcomputer performs control so as to periodically output pulses referred to as a watchdog signal to the outside. Furthermore, a monitoring circuit is connected to the outside of the microcomputer, and this monitoring circuit always monitors the watchdog signal output from the microcomputer. If abnormality occurs in the microcomputer, the watchdog signal does not appear. Upon detecting the state in which the watchdog signal does not appear for a constant time, the monitoring circuit initializes the operation of the microcomputer.

Figure 1:
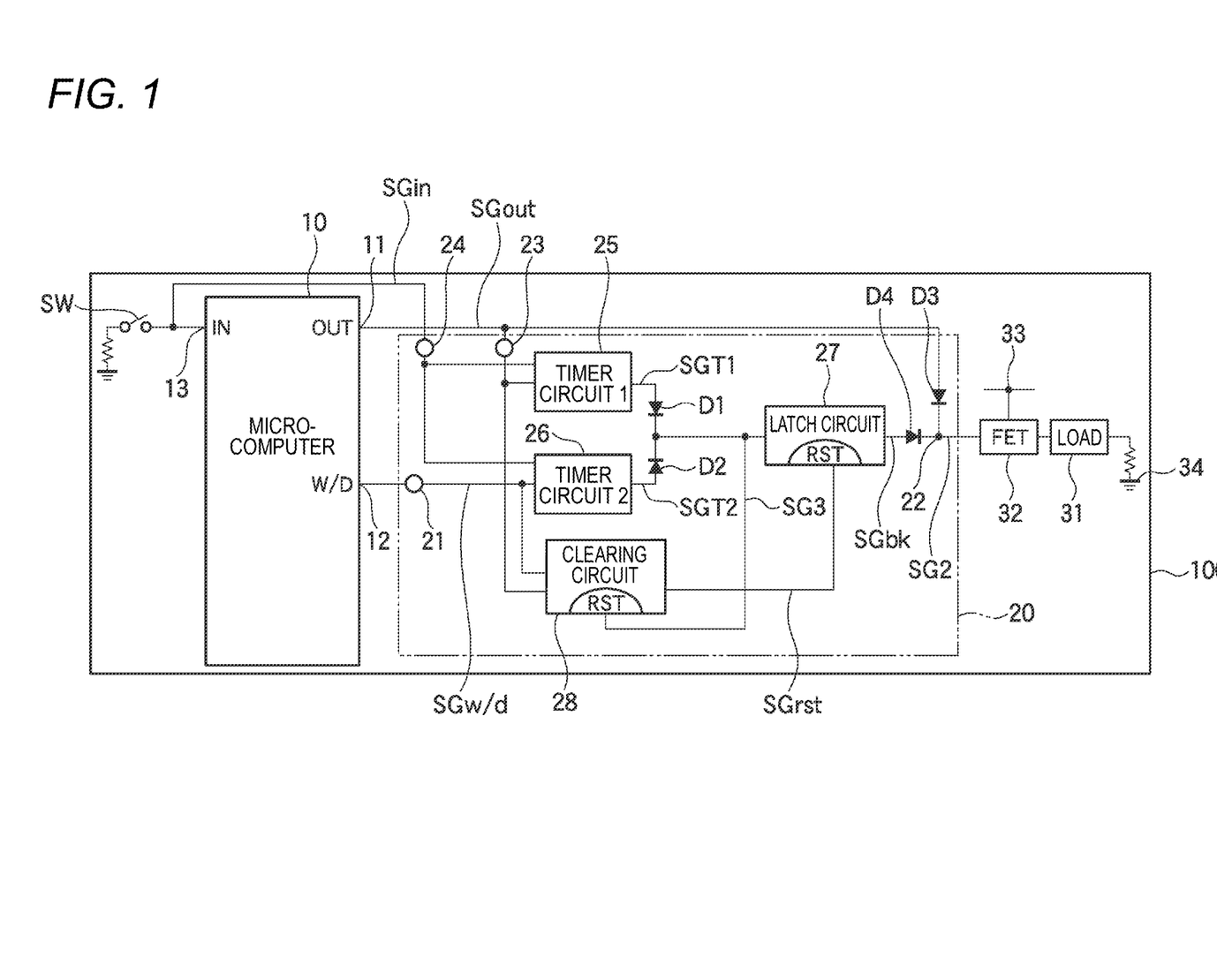
FIG. 1 is an electric circuit diagram showing a fundamental configuration example of an electronic control unit including a backup signal generating circuit according to an embodiment.

In the on-vehicle electronic control unit according to JP-A-2010-13988, if the main CPU 10 shown in FIG. 1 is brought into a runaway state and the pulse width of a watchdog signal WDS becomes excessively large, a power control circuit 113 detects this state and generates a reset pulse signal RST.

Also in the vehicle-use electronic control system according to JP-A-2011-98593, the watchdog timer 24 incorporated in a power source control IC 23 monitors the operation state of a CPU 1 on the basis of the watchdog signal transmitted from the CPU 1 and transmits a reset signal RST when abnormality occurs.

As described in JP-A-2010-13988 and JP-A-2011-98593, abnormality in the operation of the microcomputer can be detected by monitoring the watchdog signal output from the microcomputer. In addition, upon detecting abnormality, the circuit for monitoring the watchdog signal applies the reset signal to the microcomputer. When the reset signal is applied, the microcomputer initializes the state of the hardware and restarts the execution of the program from the head position thereof as at the time of power supply.

Hence, in the case that the microcomputer is brought into a runaway state due to a temporary factor, such as the entry of electromagnetic noise, the operation of the microcomputer can be returned to its normal state by applying the reset signal.

However, in the case that a continuous failure occurs inside the microcomputer, the operation of the microcomputer cannot be returned to its normal state even if the reset signal is applied. Furthermore, in the case that a failure occurs in the microcomputer provided in an electronic control unit for on/off controlling the energization of a load, the energization of the load cannot be turned on/off even in the case that a circuit for monitoring the watchdog signal is mounted.

Hence, it is desirable that a backup circuit should be mounted on an on-vehicle electronic control unit or the like in preparation for the occurrence of a failure in the microcomputer. In other words, instead of the microcomputer, a circuit for generating a backup control signal for controlling a load is necessary so that the energization of the load can be turned on/off even in the case that the microcomputer is faulty.

Moreover, even in a situation in which the microcomputer is not brought into a runaway state and the program is being executed properly, the function of only a specific output port of the microcomputer may become faulty. Hence, for example, in the case that the control signal for on/off controlling the load is generated using the faulty output port of the microcomputer, a faulty state in which the load cannot be controlled occurs and the state continues even if the watchdog signal is normal.

There is a case in which the on/off duty of load energization is adjusted by using a PWM (pulse width modulation) signal as the control signal for on/off controlling the load. Furthermore, there is a case in which energization is switched on and off using a simple binary signal (high level/low level). Hence, it is not easy to identify whether the output function of the control signal is normal or not.

Moreover, failures that may occur in the microcomputer are classified into failures that occur continuously and failures that occur temporarily. It is desirable that the backup control signal can be used even in the case that a temporary failure occurs in the microcomputer. However, if the backup control signal appears continuously at the time of recovery from the failure, the operation state of the microcomputer cannot be returned to its normal operation state.

SUMMARY

The present invention is made in consideration of the above-mentioned circumstances, and the object of the invention is to provide a load control backup signal generating circuit capable of securely outputting a backup control signal for controlling a load in the case that a failure occurs in a microcomputer.

In order to attain the above-mentioned object, a load control backup signal generating circuit according to the present invention has the characteristics described in the following items (1) to (8).

(1) A load control backup signal generating circuit for supplying a backup control signal to a switch of a load connected to an output of a control processor operating according to a program in a case that abnormality occurs in the control processor, the backup signal generating circuit including:

a first input terminal that receives a constant period signal that is output periodically from the control processor when the control processor is normal;

a constant period signal monitoring section that monitors a state of the constant period signal for identifying whether a length of the time during which a high or low level state of the constant period signal continues is longer than a predetermined time, and that outputs the signal corresponding to a result of the identification; and a backup signal output section that generates the backup control signal when the output of the constant period signal monitoring section satisfies a predetermined condition.

(2) The load control backup signal generating circuit described in the above-mentioned item (1), further including:

a second input terminal that receives a control signal that is output from the control processor when the control processor is normal;

a control signal monitoring section that monitors a state of the control signal, for identifying whether a length of the time during which the abnormal level state of the control signal continues is longer than a predetermined time, and that outputs the signal corresponding to a result of the identification, wherein the backup control signal output section generates the backup control signal when an output of the control signal monitoring section satisfies a predetermined condition.

(3) The load control backup signal generating circuit described in the above-mentioned item (2), wherein the backup signal output section generates the backup control signal according to a logical OR of a state in which the output of the constant period signal monitoring section satisfies the predetermined condition and a state in which the output of the control signal monitoring section satisfies the predetermined condition.

(4) The load control backup signal generating circuit described in the above-mentioned item (1), including:

a clock generating section that outputs clock pulses when a state signal applied to an input of the control processor is active;

a first counter that counts the clock pulses output from the clock generating section when a level of the control signal output from the control processor is a predetermined level;

a second counter that counts the clock pulses output from the clock generating section during the time in which the high or low level state of the constant period signal output periodically from the control processor continues; and a clearing circuit that returns the state of the backup signal output section to an initial state of the backup signal output section after detecting that both the control signal and the constant period signal are normal.

(5) The load control backup signal generating circuit described in the above-mentioned item (2), including:

a signal gate circuit connected between the first input terminal and the input of the constant period signal monitoring section, wherein the output of the control signal monitoring section is connected to a control input of the signal gate circuit.

(6) The load control backup signal generating circuit described in the above-mentioned item (5), including:

a clearing circuit that monitors an output signal of the signal gate circuit and that returns the state of the backup signal output section to an initial state of the backup signal output section when detecting that the output signal of the signal gate circuit is normal.

(7) The load control backup signal generating circuit described in the above-mentioned item (6), further including:

a clock generating section that outputs clock pulses when the state signal applied to the input of the control processor is active; and a counter that counts the clock pulses output from the clock generating section during the time in which a high or low level state of the constant period signal appearing at the output of the clock generating section continues.

(8) The load control backup signal generating circuit described in the above-mentioned item (7), wherein a DC shut-off capacitor is connected between the output of the signal gate circuit and an input of the counter; and wherein the input of the counter is connected to a predetermined potential line via a potential control resistor provided therebetween.

With the load control backup signal generating circuit configured as described in the above-mentioned item (1), the constant period signal monitoring section monitors the constant period signal, such as a watchdog signal, thereby being capable of securely identifying the presence or absence of abnormality. In addition, in the case that the constant period signal monitoring section detects the occurrence of abnormality, the backup signal output section generates a backup control signal. Hence, even in the case that abnormality occurs in the control processor, the energization of the load can be controlled using the backup control signal.

With the load control backup signal generating circuit configured as described in the above-mentioned item (2), the control signal monitoring section monitors the state of a control signal, such as a PWM signal or a simple binary signal, thereby being capable of securely identifying the presence or absence of abnormality. In addition, in the case that the control signal monitoring section detects the occurrence of abnormality, the backup signal output section generates a backup control signal. Hence, even in the case that abnormality occurs in the control processor, the energization of the load can be controlled using the backup control signal.

With the load control backup signal generating circuit configured as described in the above-mentioned item (3), in the case that either the constant period signal monitoring section or the control signal monitoring section detects the occurrence of abnormality, the backup control signal can be generated. Hence, the backup control signal can be output in both the case in which the abnormality having occurred in the control processor is caused due to a program runaway and the case in which the abnormality is caused due to a failure of an output port.

With the load control backup signal generating circuit configured as described in the above-mentioned item (4), the first counter can identify the presence or absence of abnormality relating to the control signal, and the second counter can identify the presence or absence of abnormality relating to the constant period signal. Furthermore, in the case that the normal state is recovered from a state in which abnormality occurs, the backup control signal can be released automatically using the function of the clearing circuit. Moreover, since the output of the clock pulses is suppressed when the state signal in not active, the backup control signal can be prevented from being output erroneously, for example, in a situation in which monitoring is not necessary or in a situation in which failure identification is impossible.

With the load control backup signal generating circuit configured as described in the above-mentioned item (5), the output state of the control signal monitoring section can be reflected to the input state of the constant period signal monitoring section. Hence, the constant period signal monitoring section can monitor both the constant period signal and the control signal simultaneously.

With the load control backup signal generating circuit configured as described in the above-mentioned item (6), in the case that the normal state is recovered from a state in which abnormality occurs, the backup control signal can be released automatically using the function of the clearing circuit. What's more, the configuration of the clearing circuit can be simplified by using the output signal of the signal gate circuit as the target to be monitored With the load control backup signal generating circuit configured as described in the above-mentioned item (7), the counter can identify whether the presence or absence of abnormality relating to the control signal and the presence or absence of abnormality relating to the constant period signal. Moreover, since the output of the clock pulses is suppressed when the state signal in not active, the backup control signal is prevented from being output erroneously, for example, in a situation in which monitoring is not necessary or in a situation in which failure identification is impossible.

With the load control backup signal generating circuit configured as described in the above-mentioned item (8), for example, when a failure occurs and the high/low level change in the constant period signal, such as the watchdog signal, stops, the input of the counter is fixed to a specified level regardless of whether the level of the constant period signal is "high" or "low", whereby reliable operation can be expected.

With the load control backup signal generating circuit according to the present invention, in the case that a failure occurs in a microcomputer, the backup control signal for controlling a load can be output securely.

The present invention has been described above briefly. The details of the present invention will be further clarified by reading the description of the mode (hereafter referred to as "embodiment") for carrying out the invention that is described below while referring to the accompanying drawings.

DETAILED DESCRIPTION OF EXEMPLARY EMBODIMENTS

A specific embodiment relating to a load control backup signal generating circuit according to the present invention will be described below referring to the drawings.
<Description of a Configuration Example>
<General Description of the Entire Control Unit>

A configuration example of the main section of an electronic control unit 100 including a backup signal generating circuit 20 according to this embodiment is shown in FIG. 1.

The electronic control unit 100 shown in FIG. 1 includes a microcomputer 10 serving as a main control section. The microcomputer 10 can perform control for realizing functions required for the electronic control unit by executing programs incorporated beforehand in an internal memory (ROM), for example.

In the configuration example shown in FIG. 1, the microcomputer 10 has a function of controlling the energization of a load 31 depending on the on/off of the state signal SGin output from an instruction switch SW. Furthermore, when the energization of the load 31 is turned on, the current value for the load can be adjusted by performing duty control using a PWM signal.

A switch operable by the user or a sensor or the like can be assumed as a specific example of the instruction switch SW. The microcomputer 10 starts the output of a control signal SGout so that the load 31 is energized when the instruction switch SW is turned on and stops the output of the control signal SGout so that the load 31 is not energized when the instruction switch SW is turned off. The control signal SGout is a PWM signal or a binary signal.

Each of various on-vehicle electric components can be assumed as a specific example of the load 31. Furthermore, a switching device 32 composed of a power FET controls the on/off state of the energization of the load 31 according to the on/off (high level/low level) state of an energization control signal SG2, such as a PWM signal or a binary signal.

By the processing of the microcomputer 10, the energization control signal SG2 for controlling the load 31 usually changes depending on the control signal SGout that is output to the output port 11 of the microcomputer. However, a continuous or temporary failure may occur in the microcomputer 10 in some cases. If the microcomputer 10 fails, the control signal SGout does not change, whereby the microcomputer is brought into a state of being unable to perform the on/off control of the load 31.

The backup signal generating circuit 20 is mounted as a backup in the case that the microcomputer 10 becomes faulty. In other words, when abnormality occurs in the control signal SGout to be output normally, a backup control signal SGbk output from the backup signal generating circuit 20, instead of the microcomputer 10, controls the load 31.
<Description of the Backup Signal Generating Circuit 20>

The backup signal generating circuit 20 shown in FIG. 1 includes a watchdog input terminal 21, a backup control signal output terminal 22, a control signal input terminal 23 and a state signal input terminal 24 to input and output various signals. In addition, two timer circuits 25 and 26, a latch circuit 27, a clearing circuit 28 and diodes D1 to D4 are provided inside the backup signal generating circuit 20.

One input terminal of the timer circuit 25 is connected to the output port 11 of the microcomputer 10 via the control signal input terminal 23. Hence, the timer circuit 25 can monitor the high (Hi)/low (Lo) level (potential) of the control signal SGout. Furthermore, the other input terminal of the timer circuit 25 is connected to the instruction switch SW via the state signal input terminal 24. Consequently, the timer circuit 25 can perform operation depending on the high (Hi)/low (Lo) level of the state signal SGin representing the on/off state of the instruction switch SW.

When the level of the state signal SGin is active (Hi), the timer circuit 25 detects whether the time during which the "Lo" level state of the control signal SGout continues is longer than a predetermined threshold time (Tth1) as the presence or absence of abnormality, and outputs a binary signal representing the result of the detection as a timer output signal SGT1. When the level of the state signal SGin is inactive (Lo), the detection operation is prohibited.

One input terminal of the timer circuit 26 is connected to the watchdog signal output port 12 of the microcomputer 10 via the watchdog input terminal 21. Hence, the timer circuit 26 can monitor the high (Hi)/low (Lo) level of a watchdog signal SGw/d. Furthermore, the other input terminal of the timer circuit 26 is connected to the instruction switch SW via the state signal input terminal 24. Consequently, the timer circuit 26 can perform operation depending on the high (Hi)/low (Lo) level of the state signal SGin representing the on/off state of the instruction switch SW.

When the level of the state signal SGin is active (Hi), the timer circuit 26 detects whether the time during which the "Lo" or "Hi" level state of the watchdog signal SGw/d continues is longer than a predetermined threshold time (Tth2) as the presence or absence of abnormality, and outputs a binary signal representing the result of the detection as a timer output signal SGT2. When the level of the state signal SGin is inactive (Lo), the detection operation is prohibited.

The output terminal of the timer circuit 25 is connected to the input terminal of the latch circuit 27 via the reverse flow preventing diode D1. In addition, the output terminal of the timer circuit 26 is connected to the input terminal of the latch circuit 27 via the reverse flow preventing diode D2.

Upon detecting either (logical OR) the presence of abnormality in the timer output signal SGT1 output from the timer circuit 25 or the presence of abnormality in the timer output signal SGT2 output from the timer circuit 26, the latch circuit 27 latches (self-holds) the level (Hi) of the state and outputs the level as the backup control signal SGbk.

The backup control signal SGbk output from the latch circuit 27 is applied to the control input (gate terminal) of the switching device 32 via the reverse flow preventing diode D4. Furthermore, the control signal SGout output from the output port 11 of the microcomputer 10 is applied to the control input (gate terminal) of the switching device 32 via the reverse flow preventing diode D3. Hence, the on/off of the switching device 32 is determined by either (logical OR) the control signal SGout or the backup control signal SGbk.

The clearing circuit 28 is provided to return the latch circuit 27 to its initial state and to stop the output of the backup control signal SGbk at the time of detection of the normal state. One input terminal of the clearing circuit 28 is connected to the output port 11 via the control signal input terminal 23. Furthermore, the other input terminal of the clearing circuit 28 is connected to the watchdog signal output port 12 via the watchdog input terminal 21. Moreover, a signal SG3 serving as the logical OR of the two timer output signals SGT1 and SGT2 is applied to the reset input (RST) of the clearing circuit 28.

The clearing circuit 28 identifies whether a normal signal appears as the control signal SGout after the level "Hi" of the signal SG3 is latched by the latch circuit 27 and whether a normal signal also appears as the watchdog signal SGw/d and then outputs a binary signal representing the result of the identification as a reset signal SGrst. This reset signal SGrst is applied to the reset input (RST) of the latch circuit 27.

<Description of Operation>
<Description of Basic Operation>

Figure 2:
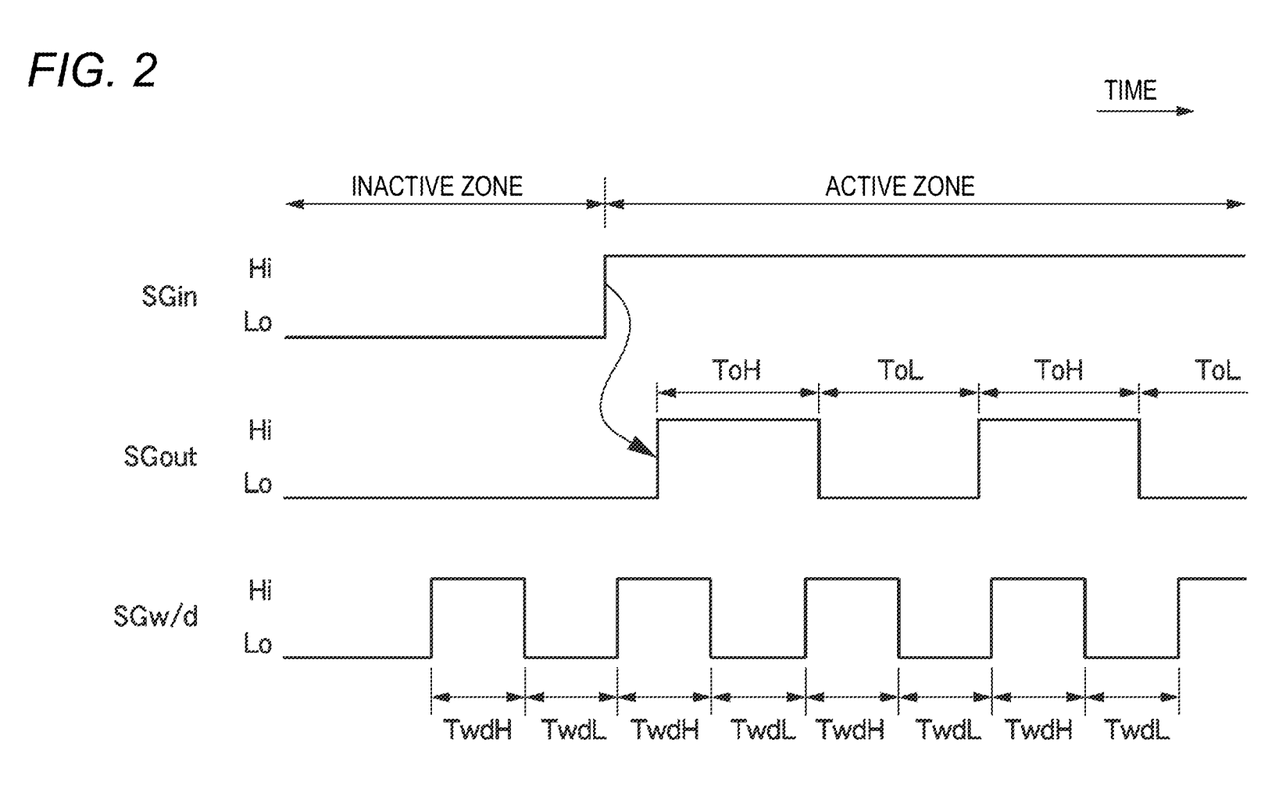
FIG. 2 is a timing chart showing main electric signals in the electronic control unit shown in FIG. 1.

Examples of the waveforms and timings of main electric signals in the electronic control unit 100 shown in FIG. 1 are shown in FIG. 2.

In the electronic control unit 100 shown in FIG. 1, when the instruction switch SW is turned on, the microcomputer 10 detects the active level of the state signal SGin, and the microcomputer 10 outputs the control signal SGout to the output port 11 according to the state signal. The control signal SGout is normally a PWM signal, the "Hi/Lo" level of which is switched periodically, or a binary signal, the level of which is fixed to "Hi", as shown in FIG. 2. Furthermore, in the case of the PWM signal, duty control can be performed by adjusting the ratio between the "Hi" zone (ToH) and the "Lo" zone (ToL) of the signal.

On the other hand, the microcomputer 10 inverts the level of the signal of the watchdog signal output port (W/D) 12 in synchronization with the execution of the processing of each routine in a program to be executed. Hence, in the state in which the microcomputer 10 is normally executing the program, a pulse signal in which Hi/Lo switching occurs in a relatively short period appears continuously as the watchdog signal SGw/d output from the watchdog signal output port 12 as shown in FIG. 2.

<In the Case that the Watchdog Signal SGw/d is Abnormal>

Figure 3:
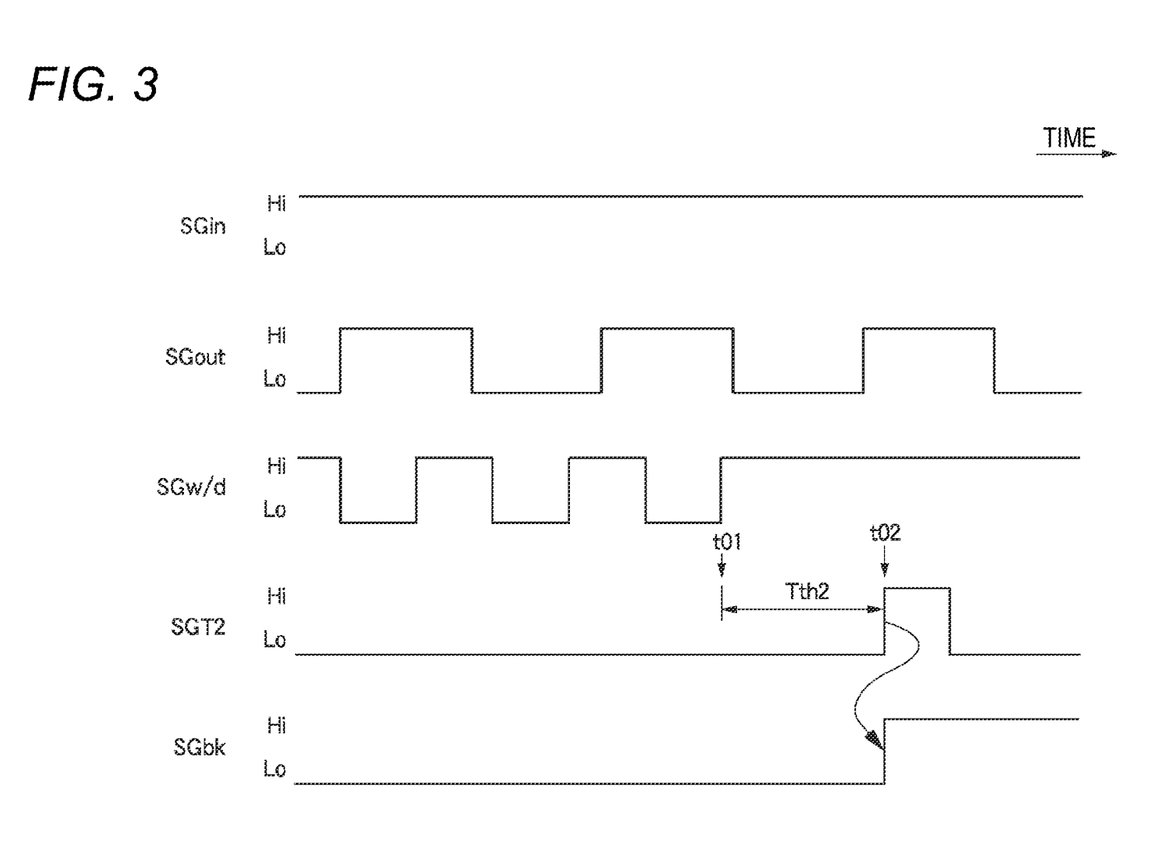
FIG. 3 is a timing chart showing operation in the case that abnormality occurs in a watchdog signal.

An operation example in the case that abnormality occurs in the watchdog signal SGw/d is shown in FIG. 3. The operation shown in FIG. 3 is described below.

There sometimes occurs a case in which the microcomputer 10 cannot continuously executes the program normally (the microcomputer is brought into a runaway state), for example, due to the influence of electromagnetic noise entering from the outside of the unit or due to defects (bugs) in the program. In such a case, the microcomputer 10 cannot switch the level of the watchdog signal output port 12 in each routine, whereby the pulse of the watchdog signal SGw/d stops and its level is fixed to "Hi" or "Lo".

In the operation example shown in FIG. 3, it is assumed that abnormality occurs in the operation of the microcomputer 10 around time t01, the pulse of the watchdog signal SGw/d stops at time t01, and the level of the pulse remains "Hi" and unchanged.

On the other hand, in the backup signal generating circuit 20 shown in FIG. 1, the timer circuit 26 monitors the pulse of the watchdog signal SGw/d. More specifically, the timer circuit identifies whether the length of the time during which the "Hi" or "Lo" level state of the watchdog signal SGw/d continues is longer than a predetermined threshold time (Tth2).

In the operation example shown in FIG. 3, after the change of the level of the watchdog signal SGw/d from "Lo" to "Hi" at time t01, the "Hi" state continues for a long time. Hence, the level of the timer output signal SGT2 changes from "Lo" to "Hi" at time t02 when the elapsed time from time t01 is more than the threshold value (Tth2). In other words, the change of the level of the timer output signal SGT2 to "Hi" means the occurrence of abnormality in the watchdog signal SGw/d.

What's more, when the level of the timer output signal SGT2 output from the timer circuit 26 changes to "Hi", the latch circuit 27 on the latter stage latches this level "Hi" and outputs the level as the backup control signal SGbk.

In other words, as shown in FIG. 3, when the time longer than the predetermined time (Tth2) elapses after the watchdog signal SGw/d remains unchanged, "Hi" is output as the backup control signal SGbk. Hence, in the case that the microcomputer 10 is brought into a runaway state and the watchdog signal SGw/d stops, the on/off operation of the switching device 32 can be controlled using the backup control signal SGbk.

<In the Case of Abnormality in the Control Signal SGout>

Figure 4:
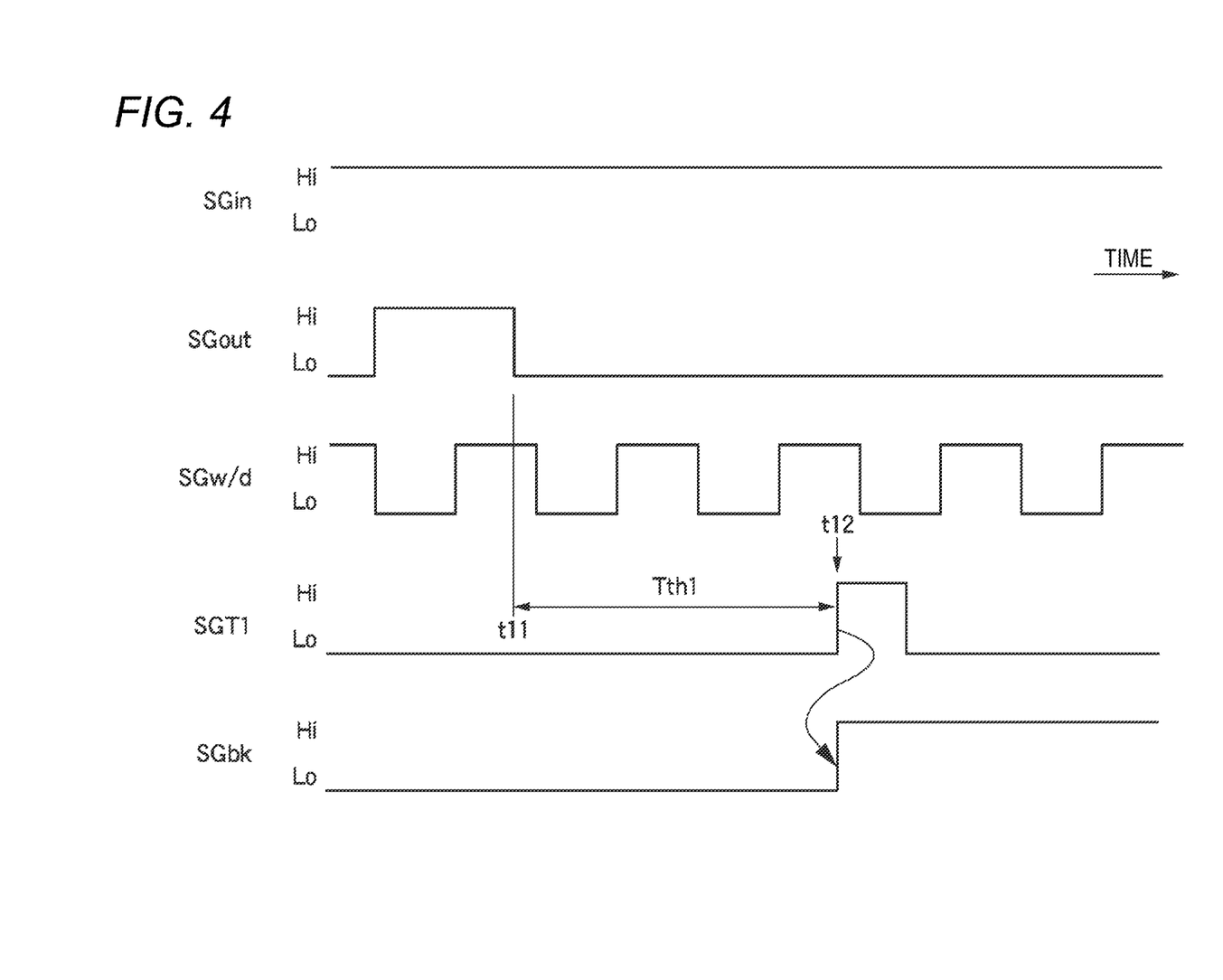
FIG. 4 is a timing chart showing operation in the case that abnormality occurs in a control signal.

An operation example in the case that abnormality occurs in the control signal SGout is shown in FIG. 4. The operation shown in FIG. 4 is described below.

Even in the case that the microcomputer 10 continues the execution of the program normally, there sometimes occurs a case in which some of the functions of the microcomputer 10 become faulty. For example, if a physical failure occurs in the circuit of the output port 11, the actual level of the output port 11 may sometimes remain unchanged at "Lo" even if "Hi" is output to the output port 11 by the execution of the program using the microcomputer 10.

The timer circuit 25 shown in FIG. 1 monitors the control signal SGout to detect the occurrence of such a failure. Actually, the state in which pulses appear periodically in the control signal SGout is normal, and the state in which the level of the control signal SGout is fixed to "Hi" is also normal. On the other hand, the state in which the level of the control signal SGout remains unchanged at "Lo" although the level of the state signal SGin is active is assumed to be abnormal. Hence, the timer circuit 25 compares the length of the time during which the "Lo" level state of the control signal SGout continues with the threshold value (Tth1) and detects the occurrence of abnormality in the case that the length is more than the threshold value.

In the operation example shown in FIG. 4, after the change in the level of the control signal SGout to "Lo" at time t11, the state in which the level remains unchanged continues for a long time. Hence, when the threshold time (Tth1) elapses from time t11, the timer circuit 25 detects abnormality, and the level of the timer output signal SGT1 becomes "Hi".

Furthermore, when the level of the timer output signal SGT1 output from the timer circuit 25 changes to "Hi", the latch circuit 27 latches this level "Hi" and outputs the level "Hi" as the backup control signal SGbk. Hence, even in the case that a failure occurs at the output port 11, the switching device 32 can be controlled using the backup control signal SGbk.

<Case in Which Abnormality is Dissolved>

Figure 5:
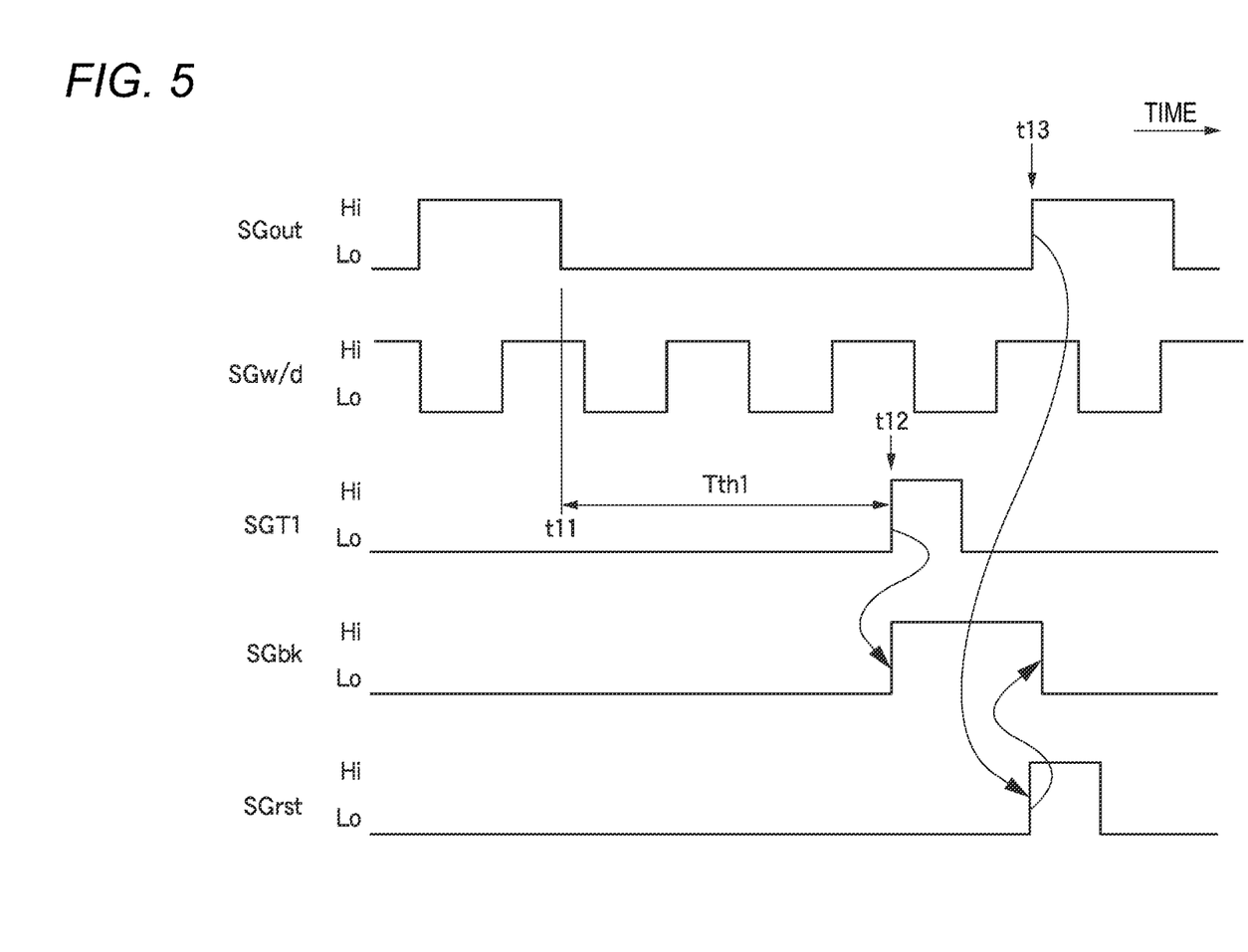
FIG. 5 is a timing chart showing operation in the case that an abnormal state is dissolved

An operation example, in which after the occurrence of abnormality in the microcomputer 10, the state of the abnormality is dissolved, is shown in FIG. 5. The operation shown in FIG. 5 is described below.

As in the case shown in FIG. 4, in the operation shown in FIG. 5, in the case that the level of the control signal SGout is fixed to "Lo" for a long time from time t11, the level of the timer output signal SGT1 becomes "Hi" at time t12 and the level of the backup control signal SGbk also becomes "Hi".

However, in the operation example shown in FIG. 5, the state of the output port 11 is recovered spontaneously after time t12, and a normal signal (Hi or pulse) appears again as the control signal SGout. In this case, the clearing circuit 28 recognizes that the watchdog signal SGw/d is normal and detects that the state of the control signal SGout is "Hi" at time t13 and then outputs a "Hi" pulse as the reset signal SGrst.

The latch circuit 27 is reset to its initial state by the "Hi" pulse of the reset signal SGrst output from the clearing circuit 28. Hence, the backup control signal SGbk output from the latch circuit 27 is reset from "Hi" to "Lo" after time t13.

In the operation example shown in FIG. 5, it is assumed that after the occurrence of abnormality in the control signal SGout, the abnormal state is returned to normal. However, also in the case of the watchdog signal SGw/d, the clearing circuit 28 can output the reset signal SGrst in a similar way.

<Description of a More Specific Configuration>

Figure 6:
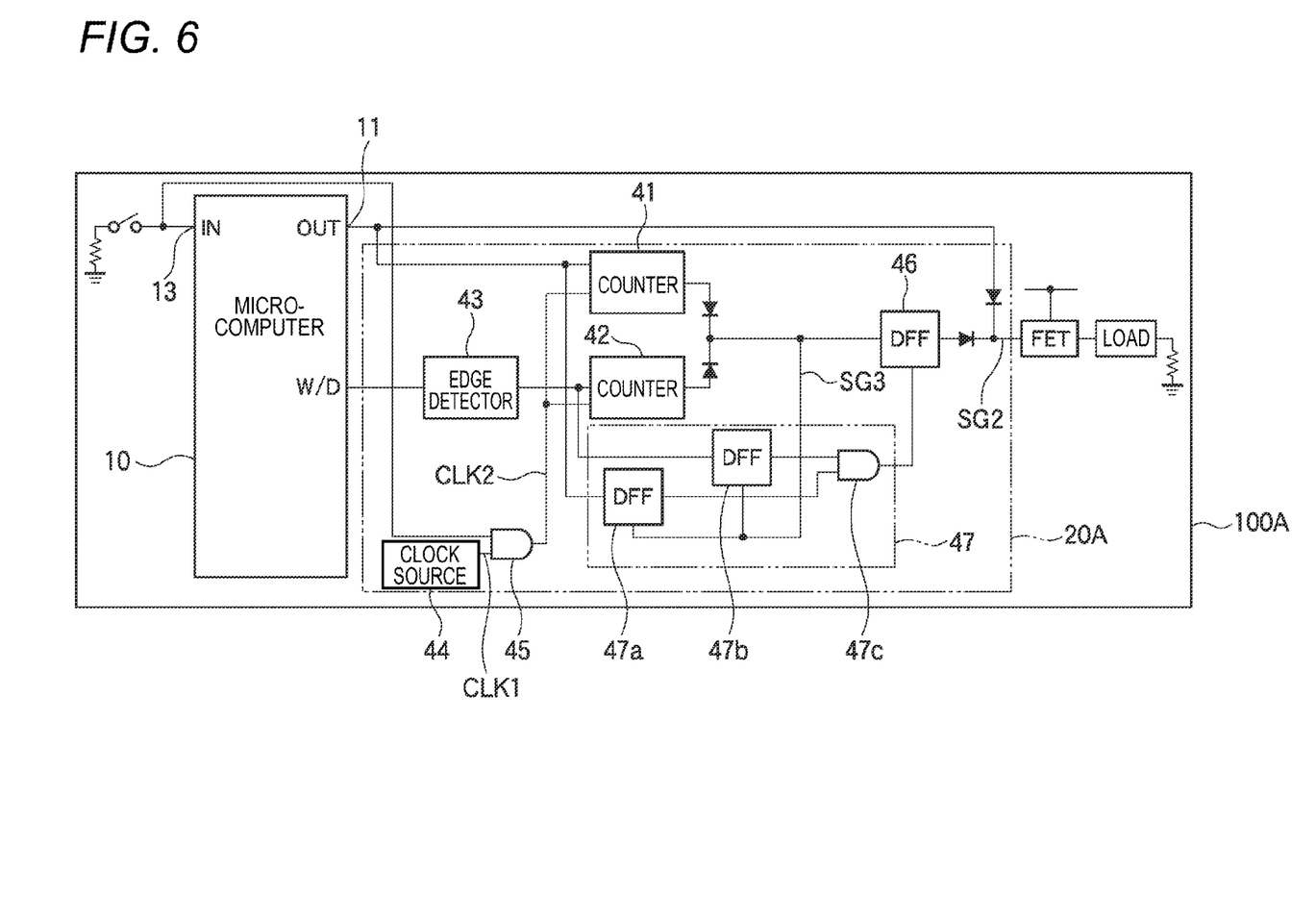
FIG. 6 is an electric circuit diagram showing a more specific configuration example of the electronic control unit shown in FIG. 1.

A more specific configuration example of the electronic control unit 100 shown in FIG. 1 is shown in FIG. 6. The configuration of the electronic control unit 100A shown in FIG. 6 is the same as that shown in FIG. 1, except for a backup signal generating circuit 20A. Hence, the backup signal generating circuit 20A is described below.

The backup signal generating circuit 20A shown in FIG. 6 includes two counters 41 and 42, an edge detector 43, a clock generator 44, an AND gate 45, a D-type flip-flop (DFF) 46 and a clearing circuit 47. Furthermore, as in the backup signal generating circuit 20 shown in FIG. 1, to each output of the counters 41 and 42 and to the output of the D-type flip-flop 46, a diode is connected.

The circuit composed of the counter 41, the clock generator 44 and the AND gate 45 in the backup signal generating circuit 20A shown in FIG. 6 realizes the same function as that of the timer circuit 25 shown in FIG. 1. Similarly, the circuit composed of the counter 42, the edge detector 43, the clock generator 44 and the AND gate 45 realizes the same function as that of the timer circuit 26 shown in FIG. 1. Furthermore, the D-type flip-flop 46 realizes the same function as that of the latch circuit 27, and the clearing circuit 47 realizes the same function as that of the clearing circuit 28.

The clock generator (clock source) 44 is composed of, for example, a CR oscillation circuit or a crystal oscillation circuit, and always generates clock pulses having a constant period. The period of the clock pulses to be generated is determined so as to be sufficiently shorter than the period of the PWM pulses of the control signal SGout and the period of the pulses of the watchdog signal SGw/d.

The AND gate 45 generates a clock pulse signal CLK2 on the basis of the clock pulse signal CLK1 output from the clock generator 44 and the state signal SGin. In other words, the AND gate 45 directly outputs the clock pulse signal CLK1 as the clock pulse signal CLK2 when the level of the state signal SGin is active (Hi) and prohibits the pulse from being output as the clock pulse signal CLK2 when the level of the state signal SGin is inactive (Lo).

During the time in which the "Lo" level state of the control signal SGout continues, the counter 41 counts the number of pulses of the clock pulse signal CLK2. Hence, the counter 41 can measure the length of the time during which the "Lo" level state of the control signal SGout continues. When the level of the control signal SGout becomes "Hi", the count value of the counter 41 is cleared. In the case that the "Lo" level state of the control signal SGout continues for the predetermined time (Tth1), the output of the counter 41 becomes "Hi", and this "Hi" is applied to the input of the D-type flip-flop 46 via the diode provided at the output.

However, in the case that the level of the state signal SGin is inactive (Lo), the pulses of the clock pulse signal CLK2 are stopped, whereby the counting operation of the counter 41 is prohibited.

The edge detector 43 detects the rising edge from "Lo" to "Hi" and the falling edge from "Hi" to "Lo" in the pulse of the watchdog signal SGw/d and outputs signals at the timings of the edges. On the basis of the signal output from the edge detector 43, the counter 42 counts the number of pulses of the clock pulse signal CLK2 output from the AND gate 45 during the time from the appearance of one edge to the appearance of the next edge. When the edge appears, the count value is cleared. Hence, the counter 42 can measure the time interval between the edges of the pulse in the watchdog signal SGw/d. Furthermore, in the case that the state in which the "Lo" or "Hi" level of the watchdog signal SGw/d remains unchanged continues for the predetermined time (Tth2), the output of the counter 42 becomes "Hi", and this "Hi" is applied to the input of the D-type flip-flop 46 via the diode provided at the output. However, in the case that the level of the state signal SGin is inactive (Lo), the pulses of the clock pulse signal CLK2 are stopped, whereby the counting operation of the counter 42 is prohibited.

When "Hi" is applied to the input of the D-type flip-flop 46, the flip-flop 46 can latch the level and can output the level as the backup control signal SGbk. Moreover, by applying the reset signal SGrst to the reset terminal of the D-type flip-flop 46 after the output of "Hi" as the backup control signal SGbk, the D-type flip-flop 46 can be reset and the backup control signal SGbk can be released (Lo is output).

The clearing circuit 47 for generating the reset signal SGrst is composed of two D-type flip-flops 47a and 47b and an AND gate 47c in the example shown in FIG. 6. The D-type flip-flop 47a is reset by the signal SG3, and when the state of the control signal SGout becomes "Hi", the D-type flip-flop 47a latches (self-holds) this "Hi" and outputs the latched signal. Furthermore, the D-type flip-flop 47b is reset by the signal SG3, and when the edge detector 43 outputs an edge detection signal, the D-type flip-flop 47b latches "Hi" and outputs the latched signal. When the output of the D-type flip-flop 47a is "Hi" and the output of the D-type flip-flop 47b is "Hi", the AND gate 47c outputs the effective level "Hi" as the reset signal SGrst.

Consequently, the backup signal generating circuit 20A shown in FIG. 6 can realize functions similar to those of the components of the backup signal generating circuit 20 shown in FIG. 1. In other words, the backup signal generating circuit 20A can perform such operations as those shown in FIGS. 2 to 5.

<Description of a Modification Example of the Backup Signal Generating Circuit 20>
<Description of a Functional Configuration>

Figure 7:
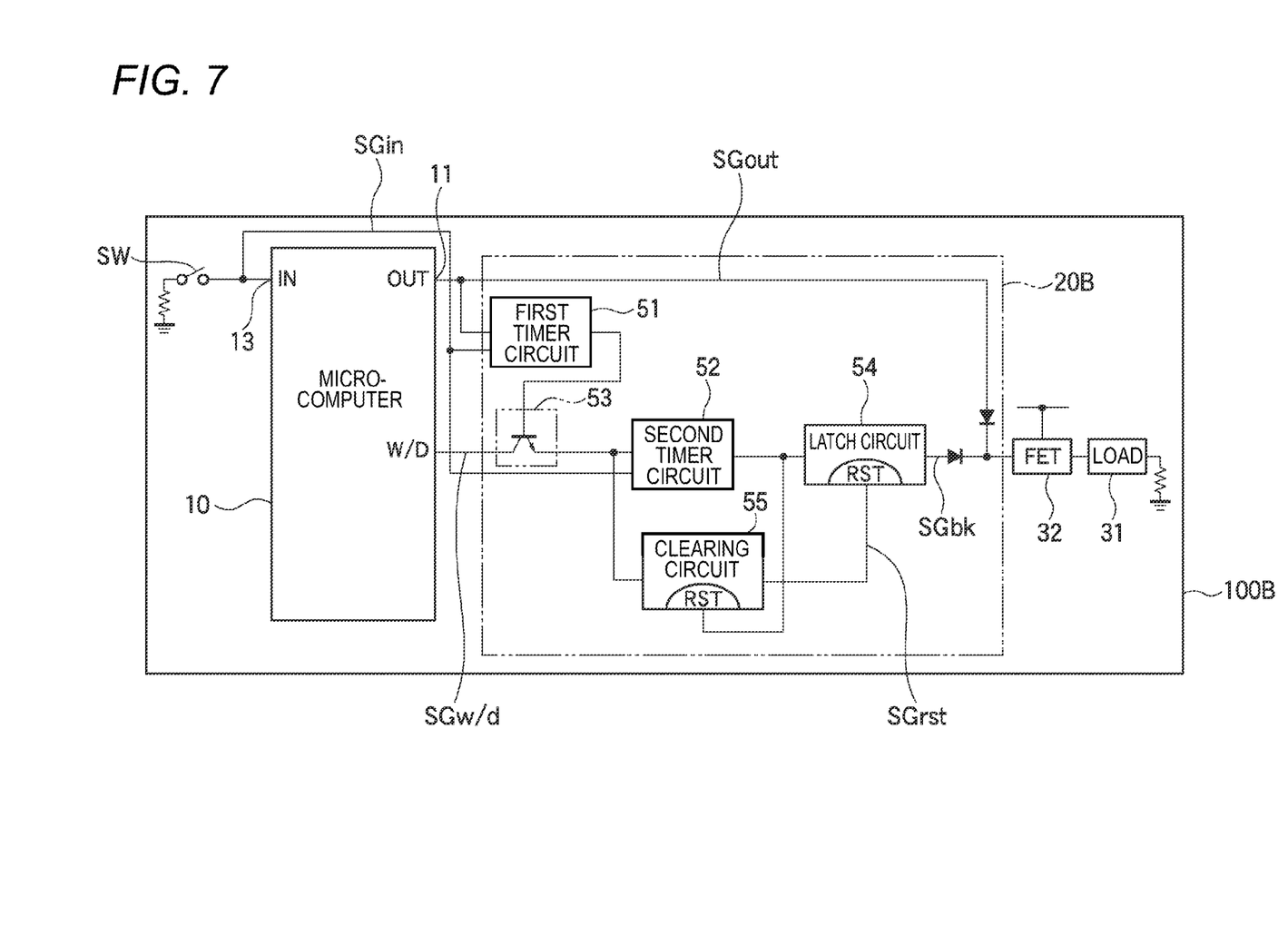
FIG. 7 is an electric circuit diagram showing a configuration of a modification example of the backup signal generating circuit.

A configuration of a modification example of the backup signal generating circuit 20 shown in FIG. 1 is shown in FIG. 7. The configuration of the electronic control unit shown in FIG. 7 is similar to that of the electronic control unit 100 shown in FIG. 1, except for the configuration of the backup signal generating circuit 20B shown in FIG. 7. Hence, the backup signal generating circuit 20B is described below.

The backup signal generating circuit 20B shown in FIG. 7 includes first and second circuits 51 and 52, an analog gate circuit 53, a latch circuit 54 and a clearing circuit 55. The first and second timer circuits 51 and 52, the latch circuit 54 and the clearing circuit 55 shown in FIG. 7 have functions similar to those of the timer circuits 25 and 26, the latch circuit 27 and the clearing circuit 28 shown in FIG. 1.

The configuration shown in FIG. 7 is significantly different from that shown in FIG. 1 in that the analog gate circuit 53 is newly inserted between the watchdog signal output port 12 of the microcomputer 10 and the second timer circuit 52 and that the output of the first timer circuit 51 is connected to the control input of the analog gate circuit 53. In addition, since only the output of the second timer circuit 52 is connected to the input of the latch circuit 54, the diodes D1 and D2 shown in FIG. 1 are not required to be connected thereto.

The analog gate circuit 53 shown in FIG. 7 is configured using a transistor. The collector terminal, the emitter terminal and the base terminal of this transistor are connected to the watchdog signal output port 12, the input of the second timer circuit 52 and the output of the first timer circuit 51, respectively.

Like the above-mentioned timer circuit 25, the first timer circuit 51 identifies the presence or absence of abnormality of the control signal SGout and outputs the signal corresponding to the result of the identification. More specifically, in the case that the "Lo" state of the control signal SGout continues for the predetermined time (Tth1) or more, the first timer circuit 51 outputs a signal for turning off the analog gate circuit 53. In the case that the control signal SGout is normal, the first timer circuit 51 outputs a signal for turning on the analog gate circuit 53.

Hence, even in the case that the pulses of the watchdog signal SGw/d are output normally, if the first timer circuit 51 detects the abnormality of the control signal SGout, the analog gate circuit 53 is turned off, and the pulses of the watchdog signal SGw/d do not appear at the input of the second timer circuit 52. Hence, the second timer circuit 52 can monitor the abnormality of the watchdog signal SGw/d and the abnormality of the control signal SGout at the same time by using one input.

In other words, in the case that the first timer circuit 51 detects the abnormality of the control signal SGout or the predetermined time elapses while the pulses of the watchdog signal SGw/d are stopped, the second timer circuit 52 detects abnormality, and the output of the second timer circuit 52 becomes "Hi". Then, the latch circuit 54 latches this "Hi" and outputs the backup control signal SGbk.

Furthermore, in the case that the pulse of the watchdog signal SGw/d appears at the output (the emitter terminal) of the analog gate circuit 53 after the output of the second timer circuit 52 is changed to "Hi, the clearing circuit 55 outputs "Hi" as the reset signal SGrst. The latch circuit 54 is reset by "Hi" of the reset signal SGrst, and the backup control signal SGbk is released.

<Description of a More Specific Configuration>

In the case of the backup signal generating circuit 20B shown in FIG. 7, the circuit configuration thereof can be simplified and the number of components can be reduced in comparison with the backup signal generating circuit 20 shown in FIG. 1. In other words, the diodes D1 and D2 shown in FIG. 1 are not necessary, and the internal configuration of the clearing circuit 55 can be simplified. A more specific configuration example of the backup signal generating circuit 20B shown in FIG. 7 is shown in FIG. 8.

Figure 8:
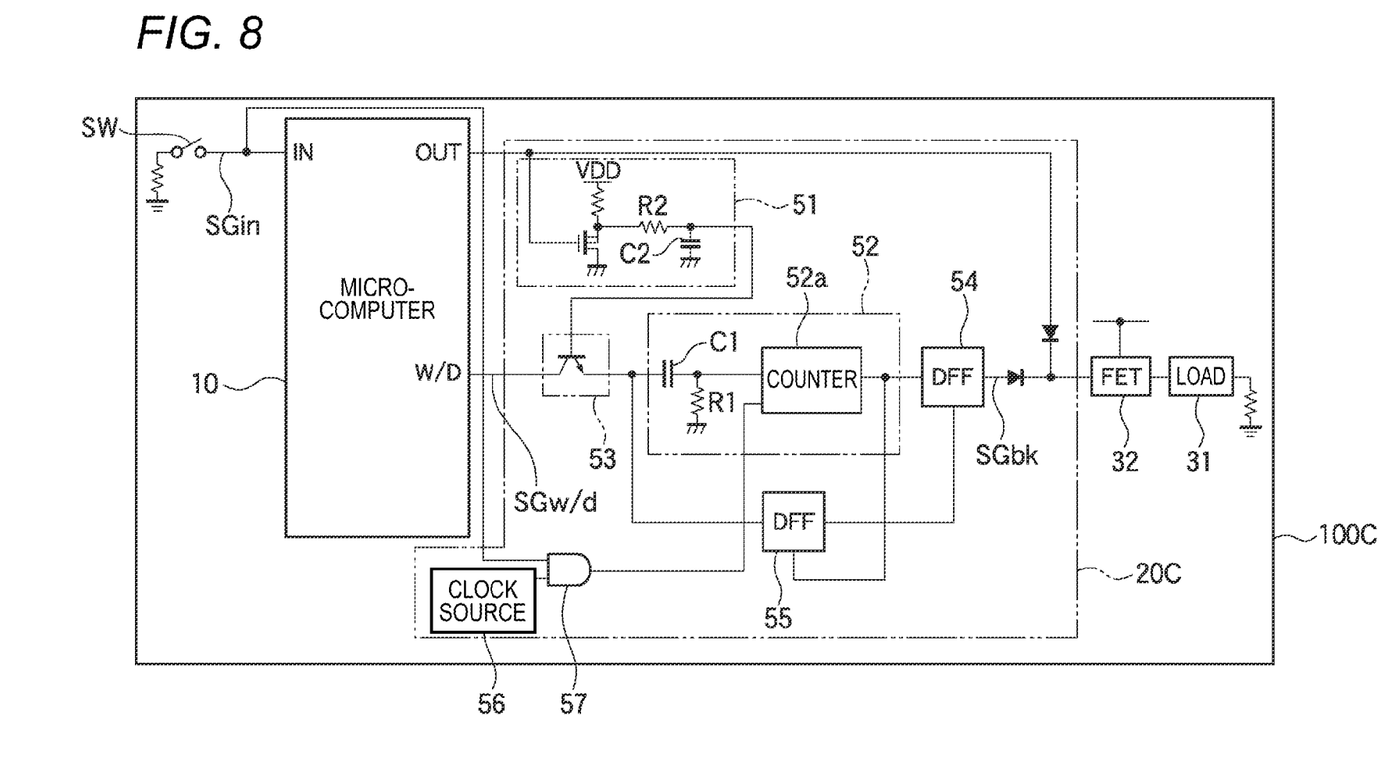
FIG. 8 is an electric circuit diagram showing a more specific configuration example of the backup signal generating circuit shown in FIG. 7.

In the backup signal generating circuit 20C shown in FIG. 8, the first timer circuit 51 is composed of a time constant circuit formed of a capacitor C2 and a resistor R2 and a transistor (FET) 51a. In addition, the timer circuit 52 is composed of a capacitor C1, a resistor R1 and a counter 52a. Furthermore, a clock generator 56 and an AND gate 57 are provided so that the counter 52a can perform time counting. The clock generator 56 and the AND gate 57 perform functions similar to those of the clock generator 44 and the AND gate 45 shown in FIG. 6.

In FIG. 8, the latch circuit 54 is composed of a D-type flip-flop (DFF). In addition, the clearing circuit 55 shown in FIG. 8 is also composed of a D-type flip-flop (DFF). Since the clearing circuit 55 monitors only the signal output from the analog gate circuit 53, its configuration is simplified and the number of components thereof is decreased in comparison with the configuration of the clearing circuit 47 shown in FIG. 6.

Instead of the edge detector 43 shown in FIG. 6, the circuit composed of the capacitor C1 and the resistor R1 is used in the circuit shown in FIG. 8. The capacitor C1 is provided to shut off the DC components of the input signal. Furthermore, the resistor R1 has a function of bringing the potential of the input (clear control terminal) of the counter 52a close to the desired potential quickly when no pulse appears in the watchdog signal SGw/d.

For example, when the microcomputer 10 becomes faulty and the pulses of the watchdog signal SGw/d are stopped, the state at the clear control terminal of the counter 52a becomes "Lo", and the counter 52a starts the counting of the clock pulses. In the case that the state at the clear control terminal does not change to "Hi" before the predetermined time elapses, the counter 52a detects abnormality, and the latch circuit 54 outputs the backup control signal SGbk.

<Possibility of Modifications Other than those Described Above>

In the backup signal generating circuit 20 shown in FIG. 1, the time measurement operations of the timer circuits 25 and 26 are prohibited when the state signal SGin output from the instruction switch SW is not active (when the microcomputer 10 does not control the load 31). Various signals can be assumed as the state signal SGin. When ordinary processing cannot be performed, for example, when the microcomputer 10 is performing initialization processing, the operation of the backup signal generating circuit 20 may be prohibited by setting the state signal SGin inactive.

The switching device 32 for controlling the energization of the load 31 is not limited to the power FET, but various switching devices, such as an IPD (intelligent power device), can be used.

The relationship between the "Hi/Lo" level of each signal and the on/off operation of each circuit in the electronic control unit 100 and the backup signal generating circuit 20 can be changed according to the specifications of the unit. Furthermore, the threshold value (Tth1) of the time in the timer circuit 25 and the threshold value (Tth2) of the time in the timer circuit 26 can also be determined appropriately according to the specifications of the unit.

Instead of the edge detector 43 shown in FIG. 6, the circuit composed of the capacitor C1 and the resistor R1 shown in FIG. 8 can be used. Conversely, the circuit composed of the capacitor C1 and the resistor R1 shown in FIG. 8 may be replaced with the edge detector 43 shown in FIG. 6.

Although the analog gate circuit 53 shown in FIG. 7 is composed of a transistor, in the case that the first timer circuit 51 outputs a digital signal, a logical circuit having an equivalent function can be used instead of the analog gate circuit 53.

Although the backup signal generating circuit 20 shown in FIG. 1 monitors two signals, i.e., the watchdog signal SGw/d and the control signal SGout output from the microcomputer 10, and generates the backup control signal SGbk, the backup signal generating circuit may be modified so as to monitor other signals. For example, the backup signal generating circuit may monitor, instead of monitoring watchdog signal SGw/d, a constant period signal similar thereto. Furthermore, although the case in which either a PWM signal or a simple binary signal appears as the signal to be output from the output port 11 is assumed in the configuration shown in FIG. 1, in the case of a unit in which a PWM signal always appears, the control signal SGout may be monitored using the timer circuit 26. Moreover, in the case of controlling a plurality of loads using a plurality of control signals SGout, respectively, the numbers of the timer circuits 25 may be increased.

The characteristics of the above-mentioned embodiment of the load control backup signal generating circuit according to the present invention will be briefly summarized and listed in the following items [1] to [8].

[1] A load control backup signal generating circuit (backup signal generating circuit 20) for supplying a backup control signal (SGbk) to a switch (switching device 32) of a load (31) connected to an output of a control processor (microcomputer 10) operating according to a program in a case that abnormality occurs in the control processor, the backup signal generating circuit including:

a first input terminal (watchdog input terminal 21) that receives a constant period signal (watchdog signal SGw/d) that is output periodically from the control processor when the control processor is normal;

a constant period signal monitoring section (timer circuit 26) that monitors a state of the constant period signal for identifying whether a length of the time during which a high or low level state of the constant period signal continues is longer than a predetermined time, and that outputs the signal corresponding to a result of the identification; and a backup signal output section (latch circuit 27) that generates the backup control signal when the output of the constant period signal monitoring section satisfies a predetermined condition.

[2] The load control backup signal generating circuit configured as described in the above-mentioned item [1], further including:

a second input terminal (control signal input terminal 23) that receives a control signal (SGout) that is output from the control processor when the control processor is normal;

a control signal monitoring section (timer circuit 25) that monitors a state of the control signal, for identifying whether a length of the time during which the abnormal level state of the control signal continues is longer than a predetermined time, and that outputs the signal corresponding to a result of the identification, wherein the backup control signal output section generates the backup control signal when an output of the control signal monitoring section satisfies a predetermined condition.

[3] The load control backup signal generating circuit configured as described in the above-mentioned item [2], wherein the backup signal output section generates the backup control signal according to a logical OR of a state in which the output of the constant period signal monitoring section satisfies the predetermined condition and the state in which the output of the control signal monitoring section satisfies the predetermined condition.

[4] The load control backup signal generating circuit (backup signal generating circuit 20A) configured as described in the above-mentioned item [1], further including:

a clock generating section (clock generator 44) that outputs clock pulses when a state signal (SGin) applied to an input of the control processor is active;

a first counter (counter 41) that counts the clock pulses output from the clock generating section when a level of the control signal output from the control processor is a predetermined level;

a second counter (counter 42) that counts the clock pulses output from the clock generating section during the time in which the high or low level state of the constant period signal output periodically from the control processor continues; and a clearing circuit (clearing circuit 47) that returns the state of the backup signal output section to an initial state of the backup signal output section after detecting that both the control signal and the constant period signal are normal.

[5] The load control backup signal generating circuit (backup signal generating circuit 20B)configured as described in the above-mentioned item [2], further including:

a signal gate circuit (analog gate circuit 53) connected between the first input terminal and the input of the constant period signal monitoring section, wherein the output of the control signal monitoring section is connected to a control input of the signal gate circuit.

[6] The load control backup signal generating circuit configured as described in the above-mentioned item [5], further including:

a clearing circuit (55) that monitors an output signal of the signal gate circuit and that returns the state of the backup signal output section to an initial state of the backup signal output section when detecting that the output signal of the signal gate circuit is normal.

[7] The load control backup signal generating circuit (backup signal generating circuit 20C) configured as described in the above-mentioned item [6], further including:

a clock generating section (clock generator 56) that outputs clock pulses when the state signal applied to the input of the control processor is active; and a counter (52a) that counts the clock pulses output from the clock generating section during the time in which a high or low level state of the constant period signal appearing at the output of the clock generating section continues.

[8] The load control backup signal generating circuit configured as described in the above-mentioned item [7], wherein a DC shut-off capacitor (capacitor C1) is connected between the output of the signal gate circuit and an input of the counter; and wherein the input of the counter is connected to a predetermined potential line via a potential control resistor (resistor R1) provided therebetween.

What is claimed is:

1. A load control backup signal generating circuit configured to supply a backup control signal to a switch of a load connected to an output of a control processor operating according to a program in a case that abnormality occurs in the control processor, the backup signal generating circuit comprising:

a first input terminal configured to receive a constant period signal that is output periodically from the control processor when the control processor is normal;

a constant period signal monitoring section configured to monitor a state of the constant period signal to identify whether a first length of time during which a high or low level state of the constant period signal continues is longer than a first predetermined time, and to output a first signal corresponding to a result of the identification by the constant period signal monitoring section;

a backup signal output section configured to generate and output the backup control signal to the switch of the load when the output of the constant period signal monitoring section satisfies a first predetermined condition;

a second input terminal configured to receive a control signal configured to control the switch of the load and that is output from the control processor to the switch of the load when the control processor is normal; and a control signal monitoring section configured to monitor a state of the control signal, to identify whether a second length of time during which an abnormal level state of the control signal continues is longer than a second predetermined time, and to output a second signal corresponding to a result of the identification by the control signal monitoring section, wherein the constant period signal is not output to the switch of the load.

2. The load control backup signal generating circuit according to claim 1, wherein the backup control signal output section is further configured to generate the backup control signal when an output of the control signal monitoring section satisfies a second predetermined condition.

3. The load control backup signal generating circuit according to claim 2, wherein the backup signal output section is further configured to generate the backup control signal according to a logical OR of a state in which the output of the constant period signal monitoring section satisfies the first predetermined condition and a state in which the output of the control signal monitoring section satisfies the second predetermined condition.

4. The load control backup signal generating circuit according to claim 1, further comprising:

a clock generating section configured to output clock pulses when a state signal applied to an input of the control processor is active;

a first counter configured to count the clock pulses output from the clock generating section when a level of the control signal output from the control processor is a predetermined level;

a second counter configured to count the clock pulses output from the clock generating section during the time in which the high or low level state of the constant period signal output periodically from the control processor continues; and a clearing circuit configured to return the state of the backup signal output section to an initial state of the backup signal output section after detecting that both the control signal and the constant period signal are normal.

5. The load control backup signal generating circuit according to claim 2, further comprising:

a signal gate circuit connected between the first input terminal and the input of the constant period signal monitoring section, wherein the output of the control signal monitoring section is connected to a control input of the signal gate circuit.

6. The load control backup signal generating circuit according to claim 5, further comprising:

a clearing circuit configured to monitor an output signal of the signal gate circuit and to return the state of the backup signal output section to an initial state of the backup signal output section when detecting that the output signal of the signal gate circuit is normal.

7. The load control backup signal generating circuit according to claim 6, further comprising:
- a clock generating section configured to output clock pulses when the state signal applied to the input of the control processor is active; and
- a counter configured to count the clock pulses output from the clock generating section during the time in which a high or low level state of the constant period signal appearing at the output of the clock generating section continues.

8. The load control backup signal generating circuit according to claim 7, wherein a DC shut-off capacitor is connected between the output of the signal gate circuit and an input of the counter; and
- wherein the input of the counter is connected to a predetermined potential line via a potential control resistor provided therebetween.

9. The load control backup signal generating circuit according to claim 1, wherein the second input terminal is different from the first input terminal and is attached to an output of a port to which the control processor output the control signal.

10. The load control backup signal generating circuit according to claim 1, wherein the control signal is transmitted in parallel to the second input terminal and to the switch of the load.

11. The load control backup signal generating circuit according to claim 1, wherein the first predetermined time is shorter than the second predetermined time.

12. The load control backup signal generating circuit according to claim 1, wherein the second signal indicates whether an error occurs in transmitting the control signal from the control processor, when the control processor is normal, to the switch of the load.

* * * * *